Figures 1, 2:
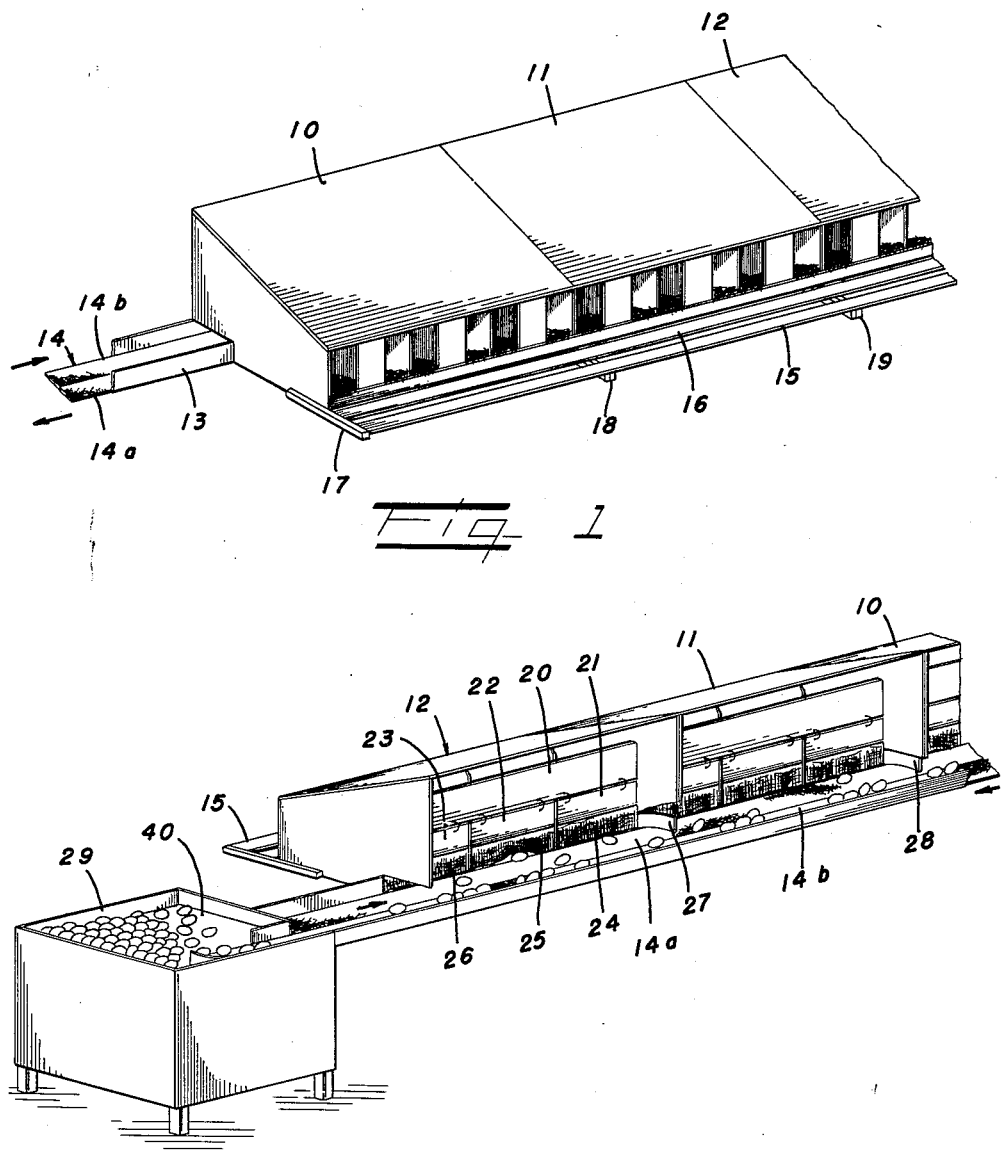

Oct. 22, 1963  G. L. KITSON  3,107,652
AUTOMATIC COLLECTION SYSTEM FOR POULTRY NESTS
Filed July 18, 1960  2 Sheets-Sheet 1

INVENTOR:
GERALD L. KITSON
BY

Oct. 22, 1963     G. L. KITSON     3,107,652
AUTOMATIC COLLECTION SYSTEM FOR POULTRY NESTS
Filed July 18, 1960     2 Sheets-Sheet 2

INVENTOR:
GERALD L. KITSON
BY

United States Patent Office

3,107,652
Patented Oct. 22, 1963

3,107,652
AUTOMATIC COLLECTION SYSTEM FOR
POULTRY NESTS
Gerald L. Kitson, 9709 Belding Road, Rockford, Mich.
Filed July 18, 1960, Ser. No. 43,363
6 Claims. (Cl. 119—48)

This invention relates to automatic egg-collection systems for poultry nests. The conventional roll-out laying nest provides a compartment in which the hens enter to lay the eggs. The floor of the nest is normally inclined sufficiently to cause the eggs to roll out onto a collection shelf; or in the case of a mechanized installation, onto the collecting conveyor. This invention relates to the latter arrangement. Standard collecting conveyor equipment involves a belt moving opposite the discharge point of a group of nests to carry the eggs to a collection area. There have been two basic problems with this type of arrangement, the first of these being the obvious continued association of the eggs with the dirt and droppings from the nests. Time-consuming cleaning operations become necessary if the appearance of the eggs is to be preserved. The second problem is the possibility that an egg rolling out of a particular nest will collide with an egg carried by a conveyor from an adjacent nest. Cracked eggs represent a loss to the operator, and the elimination of this possibility would remove one of the most troublesome problems associated with mechanized equipment.

The present invention provides a side-by-side belt system arranged opposite the discharge point of a group of nests, with the belts preferably in a horizontal co-planar relationship. The two sections of the belt preferably move in opposite directions. Eggs from the nests roll out onto the first of the two belt sections, and are carried on it until they encounter a deflector. The action of the deflector causes the eggs to move over onto the adjacent belt, on which they are carried to the collection table. The maximum simplicity is achieved by utilizing a single continuous belt with two sections moving in opposite directions, but it is entirely practical to use two independently driven belts moving in the same or opposite directions. The important aspect of the device is the transfer of the eggs by the deflection means from the first belt over to the second one. The deflector is positioned with considerable clearance above the first belt, permitting the dirt and foreign material to move on without interference. This material is dumped off the end of the belt, and is not carried with the eggs. Operation of the belts for a length of time permitting each egg to move from its point of deposit to a deflector will clear the first belt of all eggs, and remove the possibility of collision of an egg being deposited with one that is being carried. This arrangement leaves only the small possibility of collision in a case when an egg is deposited during the period of conveyor movement in which the first belt section is being cleared. The operation periods of the device can be controlled by a conventional timer, with the "off" and "on" periods being selected as desired. The duration of the "on" period should be at least sufficient to move all eggs to a point of engagement with a deflector.

The details of the invention will be analyzed through a discussion of the particular embodiments illustrated in the accompanying drawings.

In the drawings:

FIGURE 1 presents a perspective view showing a group of laying nests viewed from the entrance side.

FIGURE 2 presents a perspective view showing the same group of nests viewed from the discharge side, and showing the relationship of the nests with the collection belt and the collection table.

Figure 3:
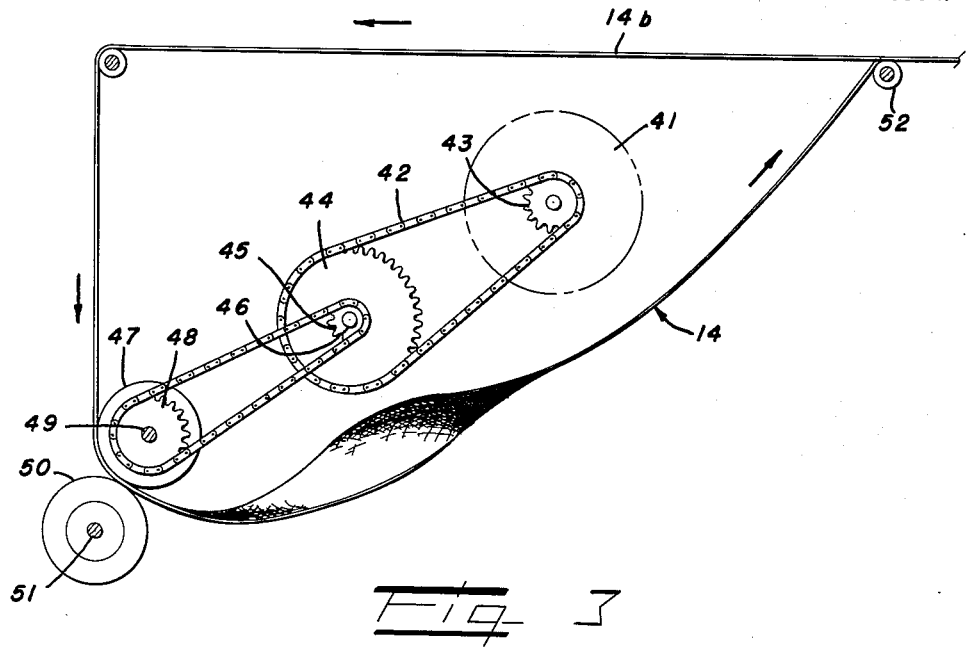

FIGURE 3 presents an enlarged schematic view showing the preferred form of a drive system for the conveyor.

Figures 4, 5:
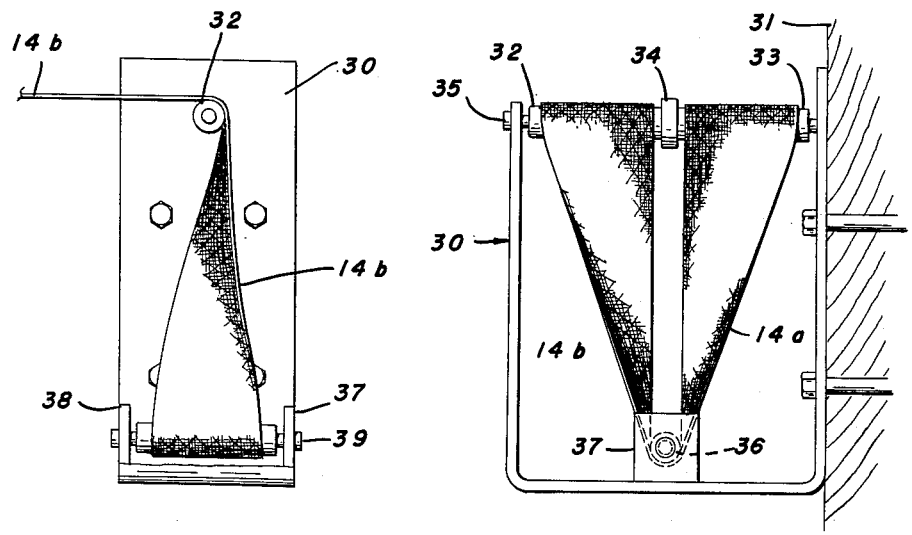

FIGURE 4 presents an enlarged view showing the idler system on the preferred form of the invention.

FIGURE 5 is a front elevation of the devices shown in FIGURE 4. The mechanism shown in FIGURES 4 and 5 is responsible for the change of direction of the belt sections at the opposite end of the belt loop from the drive system shown in FIGURE 3.

Referring to FIGURE 1, a group of nests units including the sections 10, 11, and 12 are shown in relationship with the egg collecting trough 13 containing the collecting belt 14. The belt 14 provides the oppositely-moving belt sections 14a and 14b, the functioning of which is more clearly shown in FIGURE 2. The general structure of the nest units 10–12 is conventional, entrance being facilitated by the provision of perching rails 15 and 16 supported by suitable cantilever beams 17–19.

Referring to FIGURE 2, the discharge side of the nest includes the fixed panel 20 with the hinged panel 21, 22, and 23 depending from it. Curtain sections 24, 25, and 26 permit the eggs to roll underneath them and out onto the belt section 14a. The nest structure thus far described is conventional in form. Each of the units 10–12 is similarly constructed.

Movement of the belt section 14a to the right as shown in FIGURE 2 (in the direction of the arrow) brings each of the eggs carried by that belt section to a point of engagement with a deflector plate as shown at 27 or 28. Continued movement of the belt will urge the eggs from the belt section 14a over onto the belt section 14b moving toward the collecting table 29.

Referring to FIGURES 4 and 5, the idler system providing the change of direction of the belt includes a U-shaped bracket 30 secured to any convenient structure on which the nests 10–12 are mounted. In FIGURE 5, this structure is indicated at 31, and is usually in the form of a wooden supporting leg or column. The bracket 30 carries the rollers 32 and 33 and the central spacer 34 rotatably mounted on the shaft 35. The belt section 14a, in proceeding beyond the roller 33, goes through a half-twist and is positioned by the lower roller 36. This roller is rotatably mounted on the bracket 30 between the bearing plates 37 and 38 on the shaft 39.

The driving mechanism for the belt 14 is incorporated in the collecting table 29 underneath the top panel 40 on which the eggs are received. The drive system is schematically illustrated in FIGURE 3, and includes a motor 41 driving the chain 42 with the driving sprocket 43. The driven idler sprocket 44 and the driving idler sprocket 45 are mounted on the shaft 46 on any conventional bearing arrangement, and cause the rotation of the preferably rubber-covered driving roller 47 by the sprocket 48. The driving roller 47 is mounted on the shaft 49, and the belt 14 is pinched between this roller and a pressure roller 50, which can be driven or idled, as desired. The pressure roller 50 is carried on the shaft 51. The side-by-side relationship of the belt sections 14a and 14b results in applying a twist between the driving system and the first positioning roller 52 shown in FIGURE 3.

The operation of the device may be determined by manually-actuated controls, or by a timer arrangement adjusted to operate the machine at spaced intervals for a duration of time preferably sufficient to carry the eggs from the most remote position from a deflector over into engagement with a deflector, which will result in completely clearing the belt section 14a at each period of operation of the device. Timer units for controlling the motor 41 are readily available, and may be used in relatively unmodified condition. Such timers form no part of the invention.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. In combination with a plurality of poultry nests arranged in series, said nests having an egg collecting trough at one side and being constructed to discharge eggs along a particular path therein, a system for collecting said eggs comprising: an endless belt having at least two parallel substantially coplanar horizontal adjacent courses, one of said courses being disposed along said path; a plurality of spaced transverse deflecting means arranged with substantial clearance over said one course to deflect eggs from said course over to the other of said courses on movement of said belt in a selected direction; pulley means in contact with the belt determining the position of said belt; collecting means disposed to receive eggs carried by said other course; and drive means operatively associated with said belt and said pulley.

2. In combination with a plurality of poultry nests arranged in series, said nests having an egg collecting trough at one side and being constructed to discharge eggs along a particular path therein, a system for collecting said eggs comprising: belt means having at least two parallel substantially coplanar horizontal adjacent courses moving in opposite directions, one of said courses being disposed along said path; a plurality of spaced transverse deflecting means arranged with substantial clearance over said one course to deflect eggs from said course over to the other of said courses on movement of said belt means in a selected direction; pulley means in contact with the belt determining the position of said belt means; and drive means operatively associated with said belt and said pulley.

3. In combination with a plurality of poultry nests arranged in series, said nests having an egg collecting trough at one side and being constructed to discharge eggs along a particular path therein, a system for collecting said eggs comprising: belt means having at least two parallel substantially coplanar horizontal adjacent courses, one of said courses being disposed along said path; transverse deflecting means arranged with substantial clearance over said one course to deflect eggs from said course over to the other of said courses on movement of said belt means in a selected direction, pulley means in contact with the belt determining the position of said belt means; and drive means operatively associated with said belt and said pulley.

4. In combination with a plurality of poultry nests arranged in series, said nests having an egg collecting trough at one side and being constructed to discharge eggs along a particular path therein, a system for collecting said eggs comprising: belt means having at least two parallel substantially coplanar horizontal adjacent courses, one of said courses being disposed along said path; a plurality of spaced transverse deflecting means arranged to deflect eggs from said one course exclusively over to the other of said courses on movement of said belt means in a selected direction; pulley means in contact with the belt determining the position of said belt means; and drive means operatively associated with said belt and pulley.

5. A conveyor system for transferring items from one course of a belt to another comprising: a single endless belt means having at least two parallel oppositely moving substantially coplanar horizontal adjacent courses, transverse deflecting means arranged with substantial clearance extending over and in proximity to one of said courses only to deflect items from said one course over to the other of said courses on movement of said belt means in a selected direction; pulley means in contact with the belt determining the position of said belt means; and drive means operatively associated with said belt and pulley.

6. A conveyor system for transferring items from one course of a belt to another comprising: a single endless belt means having at least two parallel substantially coplanar horizontal adjacent courses moving in opposite directions; transverse deflecting means extending over and in proximity to one of said courses only to deflect items exclusively from one particular course over to the other of said courses on movement of said belt means in a selected direction; pulley means in contact with the belt determining the position of said belt means; collecting means adjacent to and disposed to receive items carried by said other course; and drive means operatively associated with said belt and pulley.

References Cited in the file of this patent

UNITED STATES PATENTS

| 2,745,379 | Schmidt | May 15, 1956 |
| 2,897,954 | Cordis | Aug. 4, 1959 |
| 2,973,742 | Kaegebein | Mar. 7, 1961 |
| 3,064,792 | Du Broff | Nov. 20, 1962 |

FOREIGN PATENTS

| 600,770 | Great Britain | Apr. 19, 1948 |